D. S. MYERS.
TIRE.
APPLICATION FILED MAR. 1, 1919.

1,402,947.

Patented Jan. 10, 1922.

INVENTOR
Herbin S. Myers,
by his attorney
J. Edward Thebaud.

UNITED STATES PATENT OFFICE.

DERBIN S. MYERS, OF LAKEMORE, OHIO, ASSIGNOR, BY MESNE ASSIGNMENTS, TO SAMUEL JOHNSTONE, OF BUFFALO, NEW YORK.

TIRE.

1,402,947.  Specification of Letters Patent.  Patented Jan. 10, 1922.

Application filed March 1, 1919. Serial No. 280,133.

*To all whom it may concern:*

Be it known that I, DERBIN S. MYERS, a citizen of the United States, residing at Lakemore, in the county of Summit and State of Ohio, have invented certain new and useful Improvements in Tires; and I do hereby declare the following to be a full, clear, and exact description of the same, such as will enable others skilled in the art to which it appertains to make and use the same, reference being had to the accompanying drawings, and to figures of reference marked thereon, which form part of this specification.

Like figures of reference refer to like parts.

This invention relates to tires, particularly to resilient integral rubber tires.

One of the objects of this invention is to provide a solid rubber tire with transverse openings therein of such a shape and spacing as to form a circumferential series of resilient arches and cushions together with adjoining seating surfaces, affording a yielding, yet subsequently cushioned support to the wheel similar in effect to a pneumatic tire without its attendant difficulties in maintenance.

A further object is to provide a tire of a rubber ring body, having a series of circumferentially spaced convex cushions, with a seating wall opposite each cushion and closely spaced therefrom, to be engaged by the apex of said cushion, when under load conditions on a wheel, the difference of curvature of the surfaces of the seating wall and of the cushion, effecting initial contact of the apex of the cushion to facilitate its functioning as a cushion.

Another object is to provide a resilient arched and cushioned rubber tire incorporated in the making with a metallic clincher rim, which is demountable.

Another object is to incorporate in the continuous zone of rubber next to the metallic rim, one or more flat metallic rings, to strengthen the connection between the tire and the rim.

A further object is to provide a resilient arched and cushioned rubber tire with a peripheral surface formation adapted to resist skidding.

With these and other objects, my invention resides in certain construction, one embodiment of which is illustrated in the accompanying drawings, is hereafter described and the functioning of the structure is explained and what I claim is set forth.

In the drawings—

Figure 1:
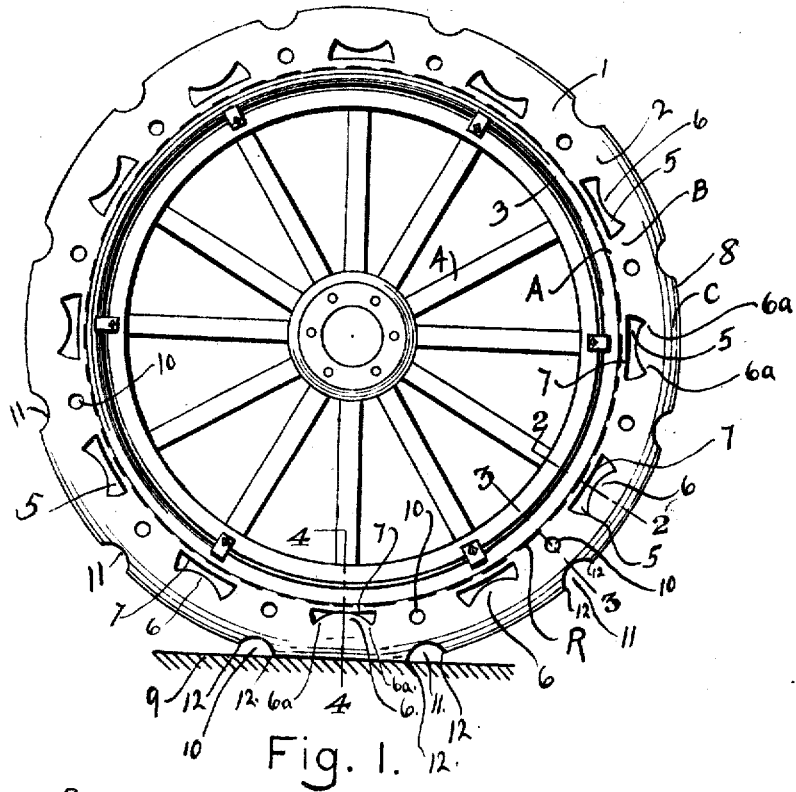
Figure 1 is a side elevation of a wheel showing a tire thereon embodying my invention.
Figure 2:
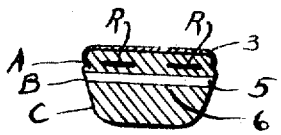
Figure 2 is a transverse section of the tire shown in Figure 1 taken on the radial line 2—2.
Figure 3:
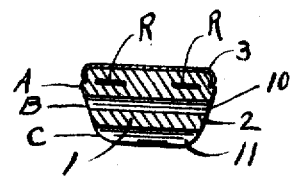
Figure 3 is a transverse section of the tire shown in Figure 1 taken on the radial line 3—3.
Figure 4:
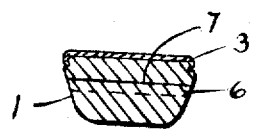
Figure 4 is a transverse section of the tire shown in Figure 1, taken on the radial line 4—4.

In the figures, the tire 1 is shown having a rubber portion 2 and a metallic rim portion 3 upon which the rubber portion 2 is cast. The rim portion 3 is made demountable with the wheel 4 to which it is attached. The rubber portion or body 2 has a continuous rubber zone A, adjoining which is a series of tranverse openings 5, etc., in central zone B. Each opening 5 is so shaped as to form an arched or convex cushion 6, which in the running of the wheel is forced in contact with the seating wall 7 of the opening 5 as the tread portion 8 of the peripheral zone C comes in contact with the ground 9, to support the wheel 4. To have the cushions 6, function as such against their respective, opposite seating walls 7, I make, as is shown in the drawing, the seating wall 7 of greater radius of curvature than the radius of curvature of the cushion, so that the apex of the cushion will be the first part thereof to come into contact with the seating wall, subsequently giving a gradually increased resistance in its cushioning effect, thereby absorbing the shock coming with the movement of the wheel. In the central zone B, are provided a series of transverse holes 10, each positioned between two adjoining openings 5. Radially opposite to each hole 10 is a transverse notch 11 in the periphery of the zone portion C. The series of notches 11 space and individualize the arched cushions 6, and at the same time afford anti-skidding edges 12, in the tread of the tire 1. Within the zone A is molded two ribbons R, braided of steel wire.

In action, the tire 1 affords a succession of arched cushions 6, yielding and rebounding as they come under and leave the influence of the load in successively supporting the same in the running of the wheel, much as the tread portion of a pneumatic tire does. Where the bending duty of the arched cushion 6 is sufficient to bring the cushion apex in contact with the wall 7 a direct rubber cushion effect takes place to relieve the bending strain at the haunches 6ª, 6ª, of the arch.

In the case of a blow coming on a rough road for instance between edges 12, the portion of rubber between the notch 11 and the hole 10 can yield into the hole 10 and provide shock absorbing feature of greater resilience than if the rubber between the wall of the notch 11 and rim portion 3 were made solid.

In as much as changes can be made in the structure of the tire herein shown and described, without departing from the spirit and scope of my invention, I do not wish to be confined to the one embodiment herein referred to.

Having described my invention, I claim—

1. A tire comprising a rubber body, a series of circumferentially spaced convex cushions in said body, each positioned to have its axis approximately parallel with the axis of the tire, also to have its crown on a line radial to said tire, and a seating wall in said body, opposite each cushion, closely spaced therefrom, to receive the crown of said cushion, when forced thereto, under loading conditions on a wheel.

2. A tire device comprising a rubber ring body, a rigid rim fixed to said body, a tread to said body, said tread having a series of spaced notches, a series of circumferentially spaced convex cushions in said body, alternately positioned with said notches, each of said cushions being positioned to have its axis approximately parallel with the axis of the tire device, also to have its crown on a line radial to said tire, and a seating wall in said body, opposite each cushion, closely spaced therefrom, to receive the crown of said cushion, when forced thereto, under loading conditions on a wheel.

3. A tire comprising a rubber body, a series of circumferentially spaced convex cushions in said body, each positioned to have its axis approximately parallel with the axis of the tire, also to have its crown on a line radial to said tire, and a seating wall in said body, opposite each cushion, closely spaced therefrom, to receive said crown, when forced thereto, under loading conditions on a wheel, the convex surface of each cushion, having less radius of curvature than that of the seating wall, adjoining and opposite thereto.

4. A tire comprising a rubber body, a series of circumferentially spaced convex cushions in said body, each positioned to have its axis approximately parallel with the axis of said tire, also to have its crown on a line radial to said tire, and a seating wall in said body, opposite each cushion, closely spaced therefrom, to receive the crown of said cushion, when forced thereto, under loading conditions on a wheel, there being holes passing transversely through said body, alternately positioned with said cushions, in the same zone thereof.

DERBIN S. MYERS.